United States Patent [19]

Merrick

[11] Patent Number: 5,084,297

[45] Date of Patent: Jan. 28, 1992

[54] ANIMAL HOOF DOG FOOD PRODUCT AND METHOD FOR MAKING SAME

[75] Inventor: Garth P. Merrick, Hereford, Tex.

[73] Assignee: Hereford Bi-Products, Inc., Hereford, Tex.

[21] Appl. No.: 631,950

[22] Filed: Dec. 21, 1990

[51] Int. Cl.$^5$ ............................................. A23K 1/10
[52] U.S. Cl. .................................. 426/641; 426/623; 426/630; 426/523; 426/805
[58] Field of Search ............... 426/641, 523, 805, 623, 426/630

[56] References Cited

U.S. PATENT DOCUMENTS

| | | | |
|---|---|---|---|
| 4,163,804 | 8/1979 | Meyer et al. | 426/315 |
| 4,231,926 | 11/1980 | Retrum | 260/123.7 |
| 4,262,028 | 4/1981 | Meyer et al. | 426/417 |
| 4,273,788 | 6/1981 | Bone et at. | 426/805 |
| 4,286,884 | 9/1981 | Retrum | 366/149 |
| 4,378,311 | 3/1983 | Retrum | 260/123.7 |
| 4,497,733 | 2/1985 | Retrum | 260/123.7 |
| 4,738,864 | 4/1988 | Ernster | 426/641 |
| 4,910,038 | 3/1990 | Ducharme | 426/641 |
| 4,921,720 | 5/1990 | Davis | 426/641 |
| 4,985,964 | 1/1991 | Lawson | 426/805 |

OTHER PUBLICATIONS

Hawley "The Condensed Chemical Dictionary", Van Nostrend Reinhold Co. Tenth Edition 1982 pp. 864–865.

Primary Examiner—R. B. Penland
Attorney, Agent, or Firm—Roylance, Abrams, Berdo & Goodman

[57] ABSTRACT

An animal hoof is soaked in a solution containing from about 50% to about 100% propylene glycol and from about 0% to about 50% water, then pressure cooked in a solution containing from about 50% to about 100% propylene glycol and from about 0% to about 50% water, the cooked in vegetable oil. The cooked hoof may then be filled with an edible filer such as dry dog food.

15 Claims, No Drawings

ANIMAL HOOF DOG FOOD PRODUCT AND METHOD FOR MAKING SAME

FIELD OF THE INVENTION

This invention relates to a dog food product made from an animal hoof and to a process for making such a product.

BACKGROUND OF THE INVENTION

Animal parts, such as ground hooves, feathers and toe nails, have been used for making food products. For example, U.S. Pat. No. 4,378,311 to Retrum discloses a method for making food products by hydrolyzing keratinaceous material such as ground up hooves and toe nails. The keratinaceous material is processed by steam hydrolysis. Other methods of hydrolysis, including enzymatic, acid or alkyl hydrolysis are mentioned as unsuitable alternatives because these methods are either too expensive or are destructive to essential amino acids. U.S. Pat. Nos. 4,497,733, 4,286,884 and 4,231,926 to Retrum relate to apparatus for practicing the method of U.S. Pat. No. 4,378,311.

U.S. Pat. No. 4,163,804 to Meyer et al. discloses a puffable, thermoplastic composition derived from animal parts such as ground up animal hooves and a method for producing the same. The method includes drying the raw animal parts to a moisture content between 10% and 25%, grinding up the animal parts and mechanically defatting those parts to a fat content of less than 18%, macerating the defatted particles in an extruder at temperatures between 200° F. and 325° F. under sufficient pressure to cause gelation of the particles and to form a thermoplastic moldable mass, extruding the moldable mass into a shape-sustaining extruded form, cooling the extruded form to below 215° F. and cutting the cooled form into multiple pellets. The multiple pellets are then puffed in hot oil to at least twice the unpuffed volume. Alternatively, the pellets may be thermo formed into a decorative shape for example, a chewable dog bone. U.S. Pat. No. 4,262,028, Meyer et al. discloses essentially the same process with the additional step of combining starch with the ground animal parts prior to extruding, frying and molding.

SUMMARY OF THE INVENTION

It has now been found that a tasty, nutritious, and entertaining dog food product may be made from a whole detached animal hoof. The animal hoof is softened and cooked by soaking it in a propylene glycol/water solution, pressure cooking it in a propylene glycol/water solution and then frying it in vegetable oil. The soaking and cooking process softens the hoof sufficient to make it edible while keeping the general shape and form of the hoof intact. The hoof prepared by the process described herein has a chewable texture allowing the dog to exercise his jaws, clean his teeth, and massage his gums. The hoof thus serves as a chewable toy treat as well as a food product. Unlike a dried hoof, the soaked and cooked hoof presents no danger of cutting the dog's gums or breaking the dog's teeth.

The natural cavity of the hoof may be filled with a edible filler such as dry dog food after the soaking and cooking process. Filling the hoof with a firm edible filler such as dry dog food prevents the hoof from collapsing during vacuum packing of the hoof. The filler also serves to provide additional nutrition and pleasure to the dog. The hoof thus serves as an edible container for dog food, allowing a more convenient means for providing dog food to a dog. Because the hoof size of a particular species is more or less similar from animal to animal, the dog food-filled hoof allows the owner to give the dog a consistent amount of food from day to day without the mess and bother of having to pour out and measure dog food.

Thus, in accordance with this invention, there is provided a process for providing a dog food product comprising soaking an animal hoof in a solution containing from about 50% to about 100% propylene glycol and from about 0% to about 50% water, pressure cooking the hoof in a solution containing about 50% to about 100% propylene glycol and from about 0% to about 50% water, and cooking the hoof in vegetable oil. There is further provided a process for providing a dog food product comprising soaking an animal hoof in a solution containing from about 50% to about 100% propylene glycol and from about 0% to about 50% water, pressure cooking the hoof in a solution containing from about 50% to about 100% propylene glycol and from about 0% to about 50% water, drying the hoof to eliminate surface moisture, then cooking the hoof in vegetable oil, allowing the hoof to cool to ambient conditions while removing excess oil, and then filling the hoof with an edible filler.

Other objects, advantages and salient features of the invention will become apparent from the following detailed description, which discloses preferred embodiments of the invention.

DETAILED DESCRIPTION OF THE INVENTION

As used in this application, the term animal hoof refers to the whole, detached hoof of any ungulate mammal such as a cow, ox, steer, bull, sheep, horse, or swine (pig). The preferred hoof is a beef hoof, that is a cow, ox, steer or bull hoof. While references are made herein to the process of preparing a single hoof, it is to be understood that a plurality of hooves may be processed simultaneously in accordance with the method of this invention.

As a first step of the process, the hoof is soaked in a solution containing from about 50% to about 100% propylene glycol and from about 0% to about 50% water, preferably for about two to three hours.

Next, the hoof is pressure cooked in a solution containing from about 50% to about 100% propylene glycol and from about 0% to about 50% water, preferably at a temperature between about 165° C. and about 187.2° C. The pressure cooking time is preferably about one to five minutes and the gauge pressure is preferably from about 210 mm Hg to about 310 mm Hg.

After pressure cooking, the hoof is dried to eliminate surface moisture. Methods of drying the hoof include air drying or mechanical drying at temperatures below 100° C. Thereafter, the hoof is cooked in vegetable oil, preferably at a temperature between about 93° C. and about 149° C. (200° to 300° F.). Any vegetable oil can be used for the oil cooking step; the preferred vegetable oil is corn oil. The oil cooking step generally takes about ten minutes.

Thereafter, the hoof may be allowed to stand to cool and drip excess oil.

The cavity of the hoof may then be filled with an edible filler so as to prevent the hoof from collapsing during vacuum sealing of the hoof. The edible filler is preferably dry dog food which can be any commercially available dry dog food. An example of a suitable dry dog food is that sold by Merrick Petfoods Inc. of Hereford, Texas under the trademark 27% Track Pro and containing the following ingredients: beef, ground yellow corn, soybean meal, corn gluten meal, wheat middling, ground wheat, beef bi-products, animal fat preserved with BHA, bone meal, salt, yeast culture, dicalcium phosphate, calcium carbonate, fish meal, distillers dried grains, choline chloride, iron proteinate, dried whey, vitamin E supplement, zinc proteinate, manganese proteinate, vitamin A acetate (stability improved), vitamin B12 supplement, copper proteinate, calcium pantothenate, ascorbic acid, niacin, soy lecithin, D-activated animal sterol (source of vitamin D3), riboflavin, menadione sodium bisulfite complex (source of vitamin K activity), ethylene diamine dihydriodide, folic acid, magnesium proteinate, pyridoxine hydrochloride, cobalt proteinate, and thiamine mononitrate. The hoof is then placed in a vacuum sealable pouch and vacuum sealed under nitrogen.

The following example illustrates the practice of this invention:

EXAMPLE

Cow hooves are soaked in a solution of 75% food grade propylene glycol and 25% water for three hours. The hooves are then placed in a fresh solution of 75% food grade propylene glycol and 25% water and cooked at a temperature of about 165° C. and a gauge pressure of about 260 mm Hg for five minutes. The hooves are air dried to eliminate surface moisture. The hooves are then cooked in corn oil at a temperature of 200° F. (93° C.) for ten minutes. The hooves are allowed to stand to cool and drip excess oil. Each hoof is then filled with 27% Track Pro dry dog food, and placed in a 6"×8" vacuum sealable pouch. The pouch is injected with food grade nitrogen gas to eliminate air and vacuum sealed.

While various embodiments have been chosen to illustrate the invention, it will be understood by those skilled in the art that various changes and modifications can be made therein without departing from the scope of the invention as defined in the appended claims.

What is claimed is:

1. A process for providing a dog food product, comprising:
    soaking an animal hoof in a solution containing from about 50% to about 100% propylene glycol and from about 0% to about 50% water, then
    pressure cooking said hoof in a solution containing from about 50% to about 100% propylene glycol and from about 0% to about 50% water, then
    cooking said hoof in vegetable oil,
    said soaking, pressure cooking, and cooking in oil steps being carried out for a sufficient time to provide a softened hoof having a chewable texture while keeping the general shape and form of the hoof intact.

2. The process of claim 1 where said animal hoof is selected from the group consisting of cow, ox, steer, bull, sheep, horse, and pig hooves.

3. The process of claim 1 wherein said solution of the soaking step is about 75% propylene glycol and about 25% water.

4. The process of claim 1 wherein said solution of the pressure cooking step is about 75% propylene glycol and about 25% water.

5. The process of claim 1 wherein the time of the soaking step is from about two to about three hours.

6. The process of claim 1 wherein the temperature of the pressure cooking step is from about 165° C. to about 187.2° C.

7. The process of claim 1 wherein the gauge pressure during the pressure cooking step is from about 210 mm Hg to about 310 mm Hg.

8. The process of claim 1 wherein the time of the pressure cooking step is from about one to about five minutes.

9. The process of claim 1 wherein the temperature of the oil cooking step is from about 93° C. to about 149° C.

10. The process of claim 1 wherein the cooking time of said oil cooking step is about 10 minutes.

11. A process for providing a dog food product, comprising:
    soaking an animal hoof in a solution containing from about 50% to about 100% propylene glycol and from about 0% to about 50% water, then
    pressure cooking said hoof in a solution containing from about 50% to about 100% propylene glycol and from about 0% to about 50% water, then
    drying said hoof to eliminate surface moisture, then
    cooking said hoof in vegetable oil, said soaking, pressure cooking, and cooking in oil steps being carried out for a sufficient time to provide a softened hoof having a chewable texture while keeping the general shape and form of the hoof intact, then
    allowing said hoof to cool to ambient conditions while removing excess oil, then
    filling said hoof with an edible filler.

12. The process of claim 11 wherein the drying step is by air drying.

13. The process of claim 11 wherein the edible filler is dry dog food.

14. The process of claim 11 including the further steps of
    placing the filled hoof in a vacuum sealable pouch, then
    replacing the air in said pouch with food grade nitrogen, then
    vacuum sealing the pouch in a nitrogen atmosphere.

15. A process for providing a dog food product, comprising:
    soaking a beef hoof in a solution containing from about 50% to about 100% propylene glycol and from about 0% to about 50% water, then
    pressure cooking said hoof in a solution containing from about 50% to about 100% propylene glycol and from about 0% to about 50% water at a temperature of from about 165° C. to about 187.2° C., at a gauge pressure of from about 210 mm Hg to about 310 mm Hg, then
    drying said hoof to eliminate surface moisture, then
    cooking said hoof in corn oil at a temperature from about 93° C. to about 149° C., said soaking, pressure cooking, and cooking in oil steps being carried out for a sufficient time to provide a softened hoof having a chewable texture while keeping the general shape and form of the hoof intact, then
    filling said hoof with dry dog food.

* * * * *